Jan. 3, 1950   M. E. SPEICHER ET AL   2,493,169
GUIDE RAIL FOR CONVEYERS
Filed Feb. 12, 1948
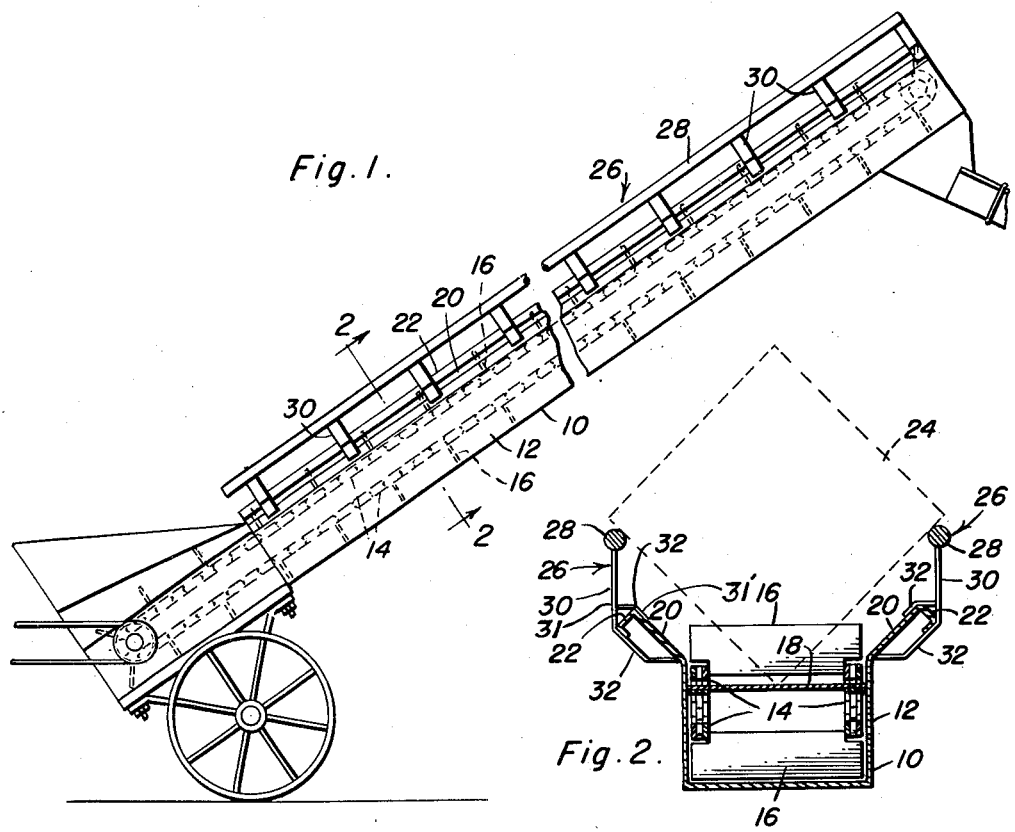
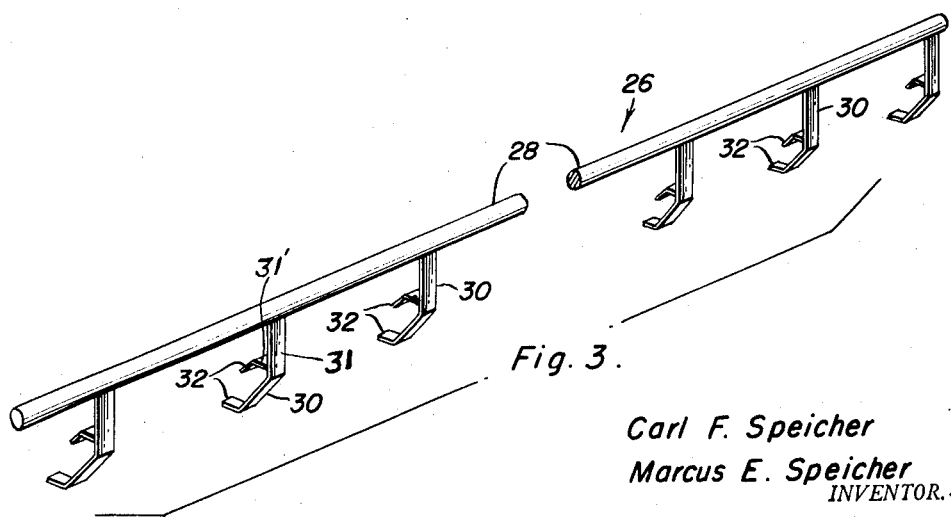
Carl F. Speicher
Marcus E. Speicher
INVENTORS Patented Jan. 3, 1950

2,493,169

UNITED STATES PATENT OFFICE 2,493,169

GUIDE RAIL FOR CONVEYERS

Marcus E. Speicher and Carl F. Speicher, Celina, Ohio

Application February 12, 1948, Serial No. 7,746

1 Claim. (Cl. 198—204)

This invention relates to new and useful improvements and structural refinements in guide rails for conveyors, such as endless chain or belt conveyors, and the like, and the principal object of the invention is to facilitate proper guiding of large boxes or bales while they pass along the conveyor, so that they do not have the conventionally experienced tendency of dragging on one side rail of the conveyor and eventually dropping laterally therefrom before reaching the end of their intended travel.

This object is achieved by the provision of what may be referred to as auxiliary side rails, the same being intended for attachment to the existing side walls of the conveyor structure, whereby the boxes, and the like, which are being conveyed will be guided in an efficient manner by the auxiliary rails, rather than by one of said side walls.

An important feature of the invention resides in the provision of guide rails which are particularly intended for use as an attachment for endless chain or belt conveyors for grain and other small, granular material, whereby such conveyors may be readily converted for use in handling large boxes, bales, and similar matter of relatively large proportions.

Another feature of the invention resides in the provision of guide rails which are simple in construction and which may be quickly and easily applied to or removed from the conveyor with which they are used.

With the above more important objects and features in view and such other objects and features as may become apparent as this specification proceeds, the invention consists essentially of the construction and arrangement of parts as shown in the accompanying drawings in which:

Figure 1 is a side elevational view of a chain or belt conveyor showing the invention in association therewith;

Figure 2 is a cross sectional view, taken substantially in the plane of the line 2—2 in Figure 1, and Figure 3 is a perspective view of one of the guide rails embodying the invention.

Like characters of reference are employed to designate like parts in the specification and throughout the several views.

Referring now to the accompanying drawings in detail, the reference character 10 designates a conventional endless chain or belt conveyor such as is commonly used for grain or other granular material, the same including in its construction, briefly speaking, a channel 12 housing an endless belt or chain assembly 14.

This belt or chain assembly is provided with a plurality of transversely extending pusher bars or plates 16 movable over a bed 18, whereby grain or other similar material is conveyed from one end of the conveyor to the other, as will be clearly apparent.

The channel 12 usually includes a pair of outwardly divergent side walls 20 formed with outturned flanges 22, the walls 20 being intended to function as guards or guides for preventing the spillage of material from the conveyor channel.

However, if the conveyor were to be used for handling large objects such as bales or boxes (having relative dimensions outlined as at 24), the spacing of the side walls 20 would be such that only one of the side walls could guide the box while contact of the box with the pushers 16 is maintained. As a result, the friction on one side of the box would be greater with respect to that on the other (resulting from the contact of the box with one of the side walls) and eventually the box would fall laterally from the conveyor before reaching the end of its intended travel.

The instant invention is, therefore, primarily intended to eliminate this disadvantage when the conveyor, normally used for grain is being used for handling large objects, the invention residing in the provision of a pair of guide rails designated generally by the reference character 26, one of which is clearly illustrated in the accompanying Figure 3.

Each of these guide rails simply consists of a rod 28 provided with a plurality of retaining clips 30, the rods 28 being disposed above and in vertical alignment with the flanges 22 of the aforementioned side walls 20 and the clips 30 extending downwardly from the rods, substantially as shown. Each of these clips consists of a strap 31 secured to and extending downwardly from the rail 28, while a strip 31' is secured to and projects laterally from an intermediate portion of the strap 31. The free end portions of the strap 31 and strip 31' are angulated to provide a pair of resilient jaws 32, configurated substantially as shown, which jaws straddle the flanges 22 and are frictionally engageable with the side walls 20, while the lower ends of the straps 31 abut the outer surfaces of the walls 20 at points below the flanges 22.

In this manner, the guide rails are firmly yet removably attached to the conveyor, and when bulk material such as boxes 24 are being handled, the boxes will ride along the conveyor with side portions thereof sliding on both of the rails 26, whereby drag on both side portions of the boxes will be equalized. Needless to say, the boxes will be pushed or propelled by pusher bars 16 which will engage the lower, central portions of the boxes, substantially as shown.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

The combination of a conveyor having an upwardly and outwardly extending side wall and a parallel flange member spaced downwardly and outwardly from the outer surface of said wall, a guide rail disposed substantially above said wall and parallel thereto, and a plurality of clips for supporting said rail in position, each of said clips comprising a strap secured at one end thereof to said rail and extending downwardly therefrom, and an inwardly extending strip secured intermediate the ends of said strap, said strip and said strap having angulated free end portions affording a pair of spaced parallel resilient jaws in frictional engagement with said wall and said flange member respectively, and the lower end of said strap abutting the outer surface of said wall at a point below said flange member.

CARL F. SPEICHER.
MARCUS E. SPEICHER.

REFERENCES CITED

The following references are of record in the file of this patent:

UNITED STATES PATENTS

| Number | Name | Date |
|---|---|---|
| 1,854,561 | Owens et al. | Apr. 19, 1932 |
| 2,457,407 | Sebastian | Dec. 28, 1948 |